United States Patent [19]

Zirps et al.

[11] Patent Number: 5,588,817
[45] Date of Patent: Dec. 31, 1996

[54] PRESSURE-MEDIUM-TRAVERSED PISTON OF A RECIPROCATING PISTON PUMP

[75] Inventors: Wilhelm Zirps, Hemmingen; Wolfgang Schuller, Sachsenheim; Martin Urban, Blaichach, all of Germany

[73] Assignee: Robert Bosch GmbH, Stuttgart, Germany

[21] Appl. No.: 491,981

[22] PCT Filed: Jun. 10, 1994

[86] PCT No.: PCT/DE94/00651

§ 371 Date: Jul. 17, 1995

§ 102(e) Date: Jul. 17, 1995

[87] PCT Pub. No.: WO95/00759

PCT Pub. Date: Jan. 5, 1995

[30] Foreign Application Priority Data

Jun. 24, 1993 [DE] Germany ............ 43 20 902.5

[51] Int. Cl.$^6$ .................................................. F04B 21/04
[52] U.S. Cl. .................. 417/549; 417/552; 137/541; 137/543.17
[58] Field of Search ........................ 417/549, 552, 417/553; 137/541, 542, 543.17

[56] References Cited

U.S. PATENT DOCUMENTS

| 578,499 | 3/1897 | Pierson | 417/549 |
| 1,293,936 | 2/1919 | Rose | 417/549 |
| 2,784,737 | 3/1957 | Kelly | 137/543.17 X |
| 5,123,819 | 6/1992 | Schuller et al. | 137/543.17 X |

Primary Examiner—Richard E. Gluck
Attorney, Agent, or Firm—Edwin E. Greigg; Ronald E. Greigg

[57] ABSTRACT

This invention is directed to a closing member of an inlet valve of a pressure-medium-traversed piston of a reciprocating piston pump. The closing member is disposed as fully as possible in the piston to minimize the dead air space. The piston has a longitudinal bore in which a stem engages the closing member, which stem emanates from a valve disk. The stem is embraced by an at least approximately frusto-conical helical compression spring acting as a closing spring. This is held, with an end segment of smaller diameter, non-twistably against the stem. A shoulder of the longitudinal bore is located on the valve seat side and exhibits at least one cross-sectional alteration for the screw-like action upon the end segment of larger diameter of the closing spring. The closing spring is thus able to be sunk into the longitudinal bore and biased in place. The reciprocating piston pump can be used, for example, for slip-regulated braking systems of motor vehicles.

8 Claims, 2 Drawing Sheets

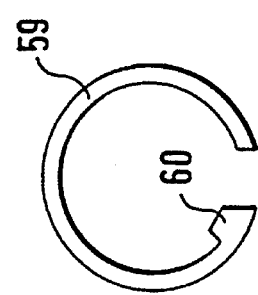
FIG. 4
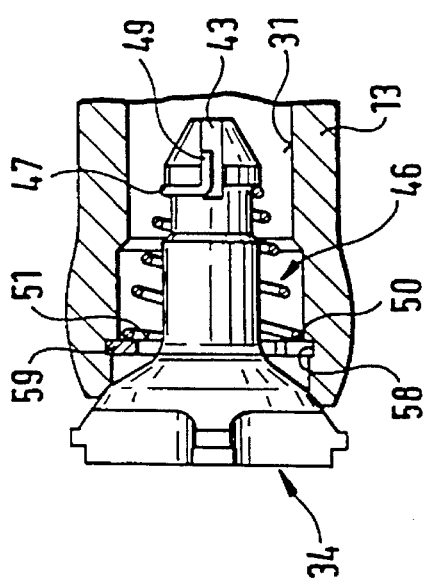
FIG. 3
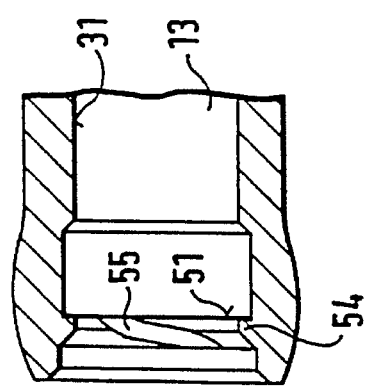
FIG. 2
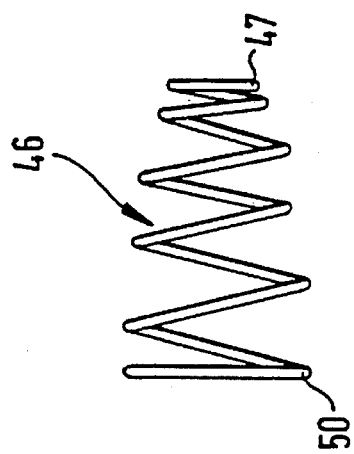
FIG. 8
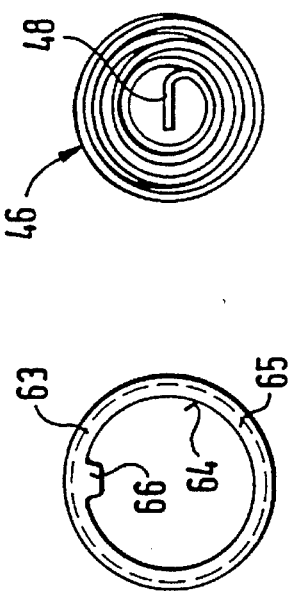
FIG. 7
FIG. 6
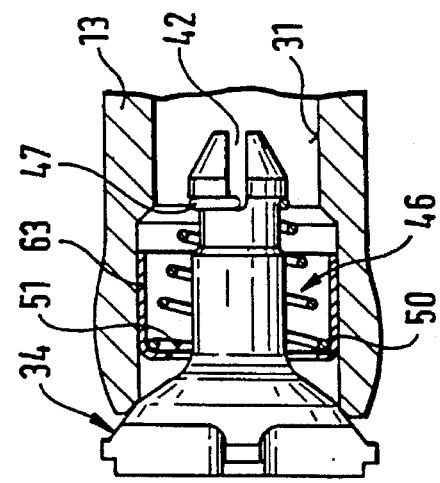
FIG. 5

5,588,817

PRESSURE-MEDIUM-TRAVERSED PISTON OF A RECIPROCATING PISTON PUMP

PRIOR ART

The invention derives from a pressure-medium-traversed piston of a reciprocating piston pump as set forth hereinafter. In piston pumps of this type, it is endeavored to make the dead space as small as possible. From French Patent Specification 1 218 349, a pump is therefore known in which the inlet valve is embedded in the piston of a one-part configuration and terminates, with the valve disk of its closing member, flush with the piston face. The stem of the closing member, which stem emanates from the valve disk, is guided snugly in a longitudinal bore of the piston. The longitudinal bore, which is configured as a pocket bore, is widened in diameter in the direction of the bore bottom and there receives a closing spring of the inlet valve. This is configured as a cylindrical helical compression spring and acts, on the one hand, upon a shoulder of the stepped longitudinal bore and, on the other hand, upon a head-like thickening at the stem end of the closing member. The depiction of this state of development in the said publication involves a schematic representation, for the thickened stem of the closing member and the longitudinal bore of the piston, which longitudinal bore is matched to the stem, and does not allow the closing member and closing spring to be fitted, in a one-part piston, from the piston face.

ADVANTAGES OF THE INVENTION

The piston according to the invention, has the advantage in relation to the above of introducing the closing spring with the stem of the closing member relatively simply into the longitudinal bore and, by virtue of a rotary motion acting upon the valve disk, of being able to sink it like a screw into the longitudinal bore, until contact is made behind the shoulder of the latter. As the installation position is reached, the bias of the closing spring is simultaneously able to be generated. A multi-part configuration of the piston is therefore dispensable.

The measures quoted herein enable advantageous refinements and improvements to be made to the piston specified herein.

The measure specified herein are is advantageous because, purely by virtue of a particular shaping of the shoulder, it enables the spring to be sunk without additional accessories.

With the difference in designs, of the piston according to the invention, the functioning of the shoulder in the longitudinal bore, both for the supporting of the spring and for the screw-like sinkage of the spring into the bore, is obtained with the use of simple component parts. The respective projection herein engages between spring windings and, upon rotation of the closing member about its longitudinal axis, produces the sinkage motion of the closing spring into the longitudinal bore.

That refinement of the invention which is specified herein serves the fastening of the closing spring to the stem of the closing member in the course of assembly and the axial support of the biased closing spring against the stem segment which limits the constriction in the direction facing away from the valve disk.

With the design which is characterized herein, a positive connection between the closing spring and the stem of the closing member is created in a simple manner so as to transmit the torque which is necessary for the screw-like sinkage of the closing spring into the longitudinal bore.

The measure specified herein renders a guide for the closing member on its stem superfluous and transposes said guide into the cylinder bore without blocking the pressure-medium flow. The valve disk, which is configured, for example, in the shape of a spherical disk, is therefore capable of aligning itself relative to its frustoconically shaped valve seat and enables the closing force to be transmitted, virtually free from transverse forces, to the valve seat.

BRIEF DESCRIPTION OF THE DRAWINGS

Illustrative embodiments of the invention are shown in simplified representation in the drawing and explained in greater detail in the following description.
In the drawing:
FIGS. 2 to 6 show illustrative embodiments for the shaping of the shoulder in the longitudinal bore, FIG. 2 showing, in longitudinal section, a shoulder having a helical-groove-shaped aperture, FIGS. 3 (longitudinal section) and 4 (front view) showing a shoulder formed by a snap ring and FIGS. 5 (longitudinal section) and 6 (front view) showing a shoulder formed by a sleeve,
and
FIGS. 7 and 8 show the closing spring in front and side view.

DETAILED DESCRIPTION OF THE ILLUSTRATIVE EMBODIMENTS

Figure 1:
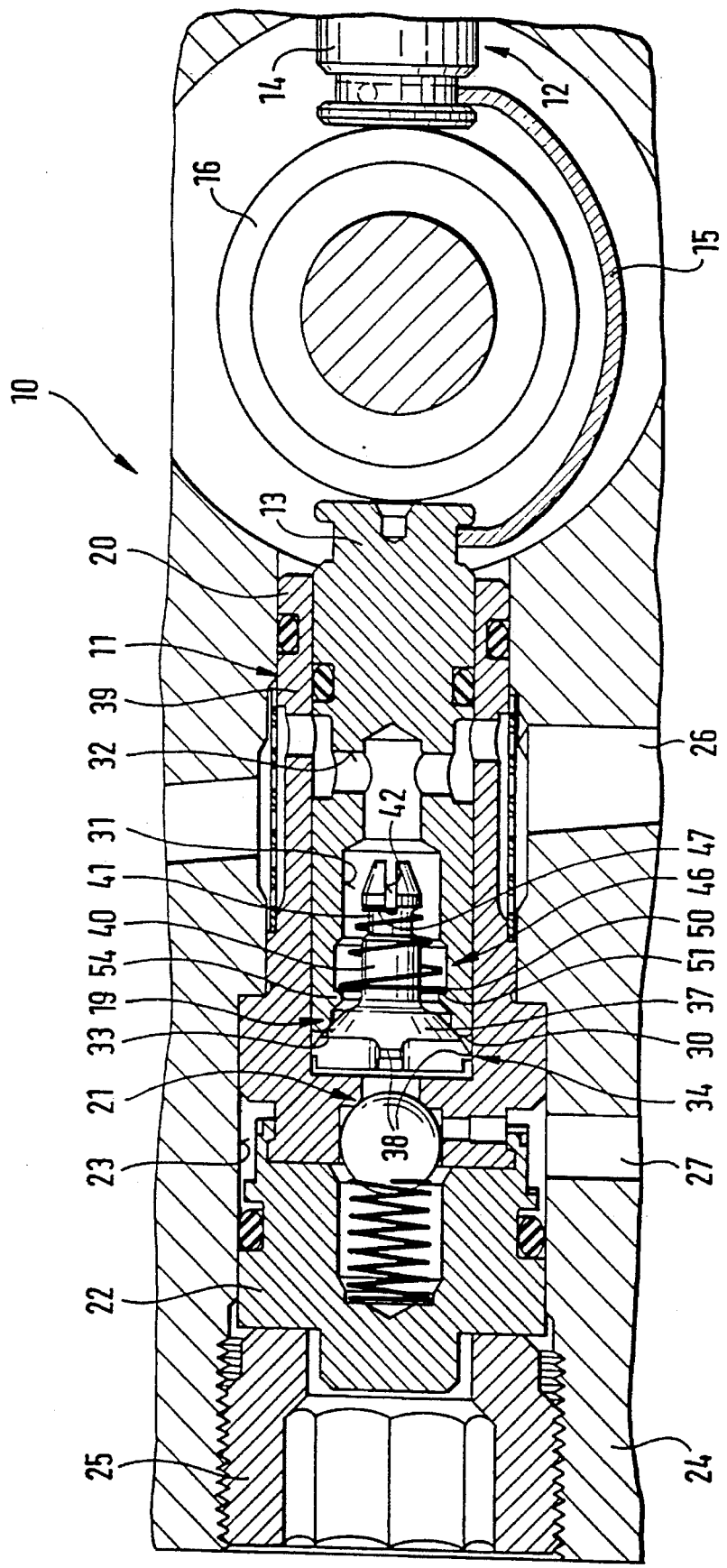
FIG. 1 shows a longitudinal section of a pump element of a reciprocating piston pump having an inlet valve disposed in the piston, the closing spring of which inlet valve acts upon a shoulder in a longitudinal bore of the piston and upon a stem of a closing member of the valve.

The representation according to FIG. 1 shows a reciprocating piston pump 10 for slip-regulated braking systems of motor vehicles. The reciprocating piston pump 10 exhibits two pump elements 11 and 12, of which the pump element 11 is depicted in full in longitudinal section. The pump elements 11 and 12 have a respective piston 13 and 14, which pistons are coupled together by a spring clip 15. The pistons 13 and 14 are supported against an eccentric 16, which can be driven by an electric motor (not represented). Since the two pump elements 11 and 12 are structurally identical, the illustrative embodiment is described below with reference to the pump element 11.

The piston 13 is provided, facing away from the eccentric, with an inlet valve 19 and is longitudinally guided in a cylinder 20. The cylinder 20 is equipped, facing away from the eccentric, with an outlet valve 21 and is connected to a valve housing 22. The pump element 11, which thus essentially comprises the piston 13 with inlet valve 19 and the cylinder 20 with outlet valve 21 and valve housing 22, is inserted in a bore 23 of a housing 24 and fastened with a locking screw 25. The housing 24 is provided with a pressure-medium supply 26 and with a pressure-medium offtake 27.

More specifically, the piston 13 and the inlet valve 19 have the following design:

The piston 13 exhibits a longitudinal bore 31, which emanates from its piston face 30 facing away from the eccentric and ends, in stepped arrangement, roughly in the middle of the piston. At the bottom of the bore, the longitudinal bore 31 is connected by a transverse bore 32 to the pressure-medium supply 26. In the region of the piston face 30, the longitudinal bore 31 passes into a conical valve seat 33 for a closing member 34 of the inlet valve 19. The pressure medium from the transverse bore 32 flows through the piston 13 to the valve seat 33.

The closing member 34 of the inlet valve 19 has a valve disk 37, configured in the shape of a spherical zone, for acting upon the valve seat 33. The valve disk 37 juts out over the piston face 30. At this segment, said valve disk is provided with projections 38, distributed over the periphery, for guidance along a bore wall 39 of the cylinder 20 receiving the piston 13. Emanating from the valve disk 37 of the closing member 34 there is an essentially circularly cylindrical stem 40, which is received in a contact-free manner in the longitudinal bore 31 of the piston 13. The stem 40 is provided, facing away from the valve disk, with a constriction 41. At its free end of frustoconical configuration, the stem 40, in the illustrative embodiment represented in FIGS. 1 and 5, is equipped with a longitudinal slot 42 emanating from the constriction 41. In the illustrative embodiment according to FIG. 3, the stem 40 exhibits, instead of the longitudinal slot 42, a longitudinal groove 43.

Additionally forming part of the inlet valve 19 is a biased closing spring 46, by which the valve disk 37 is supported against the valve seat 33. The closing spring 46, which is depicted in the relaxed state in FIGS. 7 and 8, is configured as an essentially frustoconical helical compression spring. The closing spring 46 has, at its end segment 47 of smaller diameter, a wire segment 48 running transversely to its longitudinal axis. With this wire segment 48, the closing spring 46, in the illustrative embodiments according to FIGS. 1 and 5, engages in the longitudinal slot 42, whilst the winding forming the end segment 47 of smaller diameter snugly envelops the constriction 41 of the stem 40. In the illustrative embodiment according to FIG. 3, on the other hand, there is formed onto the end segment 47 of smaller diameter of the closing spring 46 a wire segment 49 running parallel to the longitudinal axis. With said wire segment, the closing spring 46 engages in the longitudinal groove 43 of the stem 40. These two designs of the closing spring 46 allow, on the one hand, the transmission of an axial force to the stem 40 of the closing member 34, whilst, on the other hand, a torque-transmitting, positive connection between the closing spring and the stem of the closing member is obtained.

As can be seen in FIGS. 1, 3 and 5, the closing spring 46 is received fully in the longitudinal bore 31 of the piston 13. It is supported with its end segment 50 of larger diameter against a flank 51, facing away from the valve seat 33, of a shoulder of the longitudinal bore 31, which shoulder is located on the valve seat side.

In the illustrative embodiment according to FIGS. 1 and 2, the shoulder is configured as an annular projection 54 of the piston 13. This projection 54 exhibits at least one helical-groove-shaped aperture 55, for example in the style of a thread turn.

In the illustrative embodiment according to FIGS. 3 and 4, the shoulder is formed by a snap ring 59 received in a groove 58 of the longitudinal bore 31. This snap ring 59 has at least one radially inwardly directed projection 60, as is clearly discernable from FIG. 4 in the front view of the snap ring.

In the illustrative embodiment according to FIGS. 5 and 6, the shoulder is formed by a sleeve 63, which is pressed into the longitudinal bore 31 and has a base 65 exhibiting an opening 64. Here, at least one radially inwardly directed projection 66 emanates from the base rim.

The annular projection 54 (FIGS. 1 and 2), the snap ring 59 (FIGS. 3 and 4) and the sleeve 63 (FIGS. 5 and 6) are matched in their diameters such that the closing spring 46 is supported securely with bias against the flank 51, facing away from the valve seat 33, of the shoulder thus formed, so as to transmit the closing force of the inlet valve 19 to the closing member 34.

The one-part design of the piston 13 makes it necessary to introduce the closing spring 46 into the longitudinal bore 31 from the piston face 30. This is realized as follows:

The closing spring 46 is placed onto the stem 40 of the closing member 34 so that the end segment 50 of large diameter is supported against the valve disk 37 and the end segment 47 of small diameter acts in the constriction 41 on the stem 40. In the illustrative embodiments according to FIGS. 1 and 5, the wire segment 48 of the closing spring 46 engages in the longitudinal slot 42, in the illustrative embodiment according to FIG. 3 the wire segment 49 engages in the longitudinal groove 43 of the stem 40. The closing spring 46 is now held, with its end segment 47 of smaller diameter, non-twistably against the stem 40 of the closing member 34.

The closing member 34 is now introduced with the stem 40 and the closing spring 46 seated thereon, from the piston face 30, into the longitudinal bore 31. In the illustrative embodiment according to FIGS. 1 and 2, the closing spring 46 acts with its middle region upon the annular projection 54 of the longitudinal bore 31, which annular projection forms the shoulder. By rotation of the closing member 34 in the clockwise direction (viewed towards the face of the valve disk 37 facing away from the stem 40), a winding of the right-hand wound closing spring 46 enters into engagement with the at least one helical-groove-shaped aperture 55 of the annular projection 54. By continued rotation of the closing member 34, the closing spring 46 is sunk like a screw into the longitudinal bore 31 until the end segment 50 of larger diameter has overcome the annular projection 54. The end segment 50 of larger diameter of the closing spring 46, which end segment is constricted during the insertion, elastically springs out once the annular projection 54 has been overcome and now acts upon the flank 51 facing away from the valve seat. Upon reaching this assembly setting, the closing spring 46 has, at the same time, attained its predetermined biasing force.

The fitting of the closing spring 46 is realized in the same way in the illustrative embodiments according to FIGS. 3 to 6. Here, the at least one projection 60 on the snap ring 59 or the projection 66 on the base 65 of the sleeve 63 reaches between two windings of the closing spring 46 and hence, by screw-like action upon the end segment 50 of larger diameter, brings about an insertion of the closing spring 46 into the longitudinal bore 31 of the piston 13.

The foregoing relates to preferred exemplary embodiments of the invention, it being understood that other variants and embodiments thereof are possible within the spirit and scope of the invention, the latter being defined by the appended claims.

We claim:

1. A piston (13) of a reciprocating piston pump (10) through which a pressure medium flows for slip-regulated braking systems of motor vehicles, having the following features:

said piston (13) is provided with an inlet valve (19), the piston (13) exhibits a longitudinal bore (31) connected to a pressure-medium supply (26), in the region of a piston face (30), the longitudinal bore (31) opens out into a valve seat (33) of the inlet valve (19), a valve disk (37) of a closing member (34) of the inlet valve (19) is supported against the valve seat (33), a stem (40) of the closing member (34) emanates from the valve disk (37) and emanates into the longitudinal bore (31) of the piston (13), a biased closing spring (46) of the inlet valve (19) is received on the stem (40) and upon a flank, facing away from the valve seat (33), of a shoulder of the longitudinal bore (31), which shoulder is located on the valve seat side, the stem (40) of the closing member (34) is embraced by an at least approximately frustoconical helical compression spring acting as a closing spring (46), the closing spring (46) is held, with an end segment (47) of smaller diameter, non-twistably against the stem (40), and the shoulder of the longitudinal bore (31) exhibits at least one cross-sectional alteration for a screw-like action upon the end segment (40) of larger diameter of the closing spring (46).

2. The piston as claimed in claim 1, wherein the shoulder is an annular projection (54) of the piston (13) having at least one helical-groove-shaped aperture (55).

3. The piston as claimed in claim 1, wherein the shoulder is formed by a snap ring (59), inserted into the longitudinal bore (31), having at least one radially inwardly direction projection (60).

4. The piston as claimed in claim 1, wherein the shoulder is formed by a base (65), exhibiting an opening (64), of a sleeve (63) which is pressed into the longitudinal bore (31) and from a bottom rim at least one radially inwardly directed projection (66) emanates.

5. The piston as claimed in claim 1, wherein the stem (40) of the closing member (34) exhibits, facing away from the valve disk, a constriction (41), which is snugly enveloped by the closing spring (46) with at least one winding.

6. The piston as claimed in claim 5, wherein emanating from the constriction (41) of the stem (40) there is a longitudinal groove (43), extending parallel to the stem (40) in which a wire segment (49) of the closing spring (46) engages.

7. The piston as claimed in claim 5, wherein emanating from the constriction (41) of the stem (40) there is a longitudinal slot (42) extending transversely to the stem (40) in which a wire segment (48) of the closing spring (46) engages.

8. The piston as claimed in claim 1, wherein the stem (40) of the closing member (34) is received in a contact-free manner in the longitudinal bore (31) of the piston (13), whilst the valve disk (37) exhibits, on a segment jutting over the piston face (30), projections (38), which are distributed over the periphery, for acting upon a bore wall (39) of a cylinder (20) receiving the piston (13).

* * * * *